United States Patent Office.

JACOB D. HOLTZERMANN, OF PIQUA, OHIO.

Letters Patent No. 64,421, dated May 7, 1867.

IMPROVED BITTERS.

The Schedule referred to in these Letters Patent and making part of the same.

TO ALL WHOM IT MAY CONCERN:

Be it known that I, JACOB D. HOLTZERMANN, of Piqua, county of Miami, and State of Ohio, have invented a new and improved Stomach Bitters; and I do hereby declare that the following is a full and exact description of manufacturing the same.

The nature of my invention consists in so compounding certain ingredients hereinafter mentioned as to produce a healthful, pleasant, stomach bitters for dyspepsia, weakness of the stomach and bowels, and general debility.

To enable others to make and use my invention, I will proceed to describe its construction and manufacture.

I take for forty gallons, twenty-eight gallons pure spirits; thirty pounds sugar; orange peel, one and a half pound; orange apple, one pound; rad. orris, one pound; rad. galange, one-quarter pound; rad. gentian, one-half pound; rad. calamus, one-half pound; wormwood, six ounces; rad. ginger, two ounces; cardamon seed, one-twentieth part; cassia, one-twelfth part; mace, one-twelfth part; nutmeg, one-twelfth part, and cloves, one-sixth part; coriander seed, three-quarters of a pound.

What I claim as my invention, and desire to secure by Letters Patent, is—

The compounding or combination of the above-named ingredients in proportions above set forth.

J. D. HOLTZERMANN.

Witnesses:
JAS. H. HUNT,
SAML. GORDON.